H. N. HAMILTON.
Improvement in Locomotives.
No. 125,891. Patented April 23, 1872.
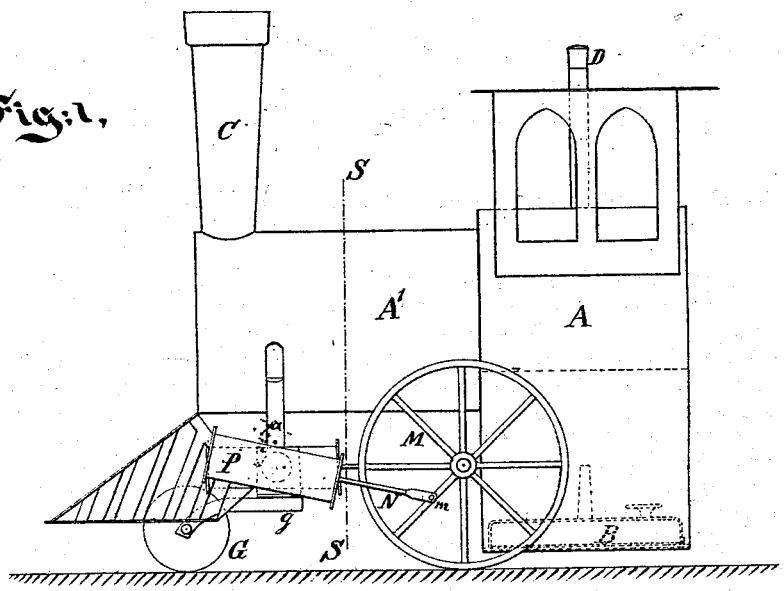
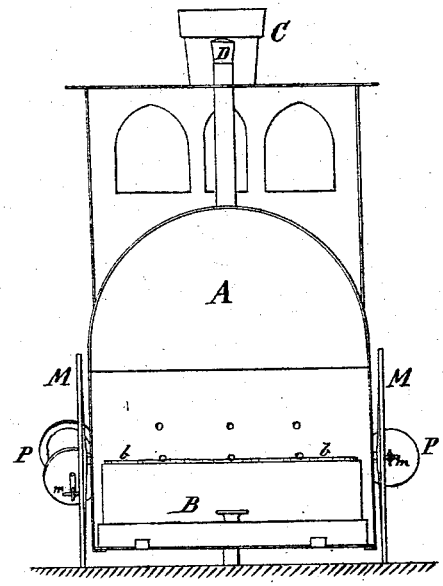 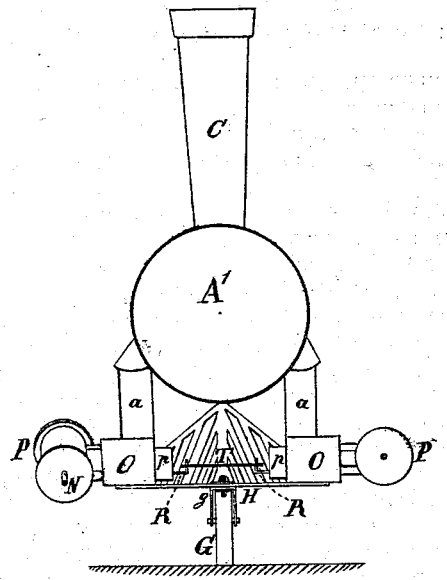
Witnesses:
Arnold Hoermann
Wm. C. Dey
Inventor:
H. N. Hamilton
by his attorney F. S. Stetson 125,891

UNITED STATES PATENT OFFICE.

HENRY N. HAMILTON, OF ARMONK, NEW YORK.

IMPROVEMENT IN LOCOMOTIVES.

Specification forming part of Letters Patent No. 125,891, dated April 23, 1872.

Specification describing an Improvement in Locomotive Steam-Engines, invented by HENRY N. HAMILTON, of Armonk, Westchester county, in the State of New York.

The invention is more especially adapted for very small engines to be used as toys; but some portions of the invention may be applied to large apparatus for a variety of useful purposes. It may be especially important in machines for diving and submarine navigation, flying, running very small locomotives through dispatch-tubes, or in analogous situations where an attendant cannot be present.

Of the many forms in which some portions of the invention may be applied I will select for this description a small locomotive.

The following is a description of what I consider the best means of carrying out my invention:

The accompanying drawing forms a part of this specification.

Figure 1 is a side elevation. Fig. 2 is a rear view, and Fig. 3 a cross section on the line S S in Fig. 1.

Similar letters of reference indicate like parts in all the figures.

A is a boiler, and A' is an extension thereof, which presents the appearance of a boiler and serves to stiffen and strengthen the structure. B is a flat lamp having a widely-extended surface filling the whole or nearly the whole of the space corresponding to the fire-box in the locomotive. The hot products of combustion from the several wicks, or one continuous wide wick, b, of the lamp, may flow through the chamber A' to the chimney C. D is a cork or other stopper inserted in the top of the boiler, which serves as a simple means of filling with water. The cork, being put in gently, will be blown out whenever the pressure of steam exceeds a proper limit.

I attach much importance to the proportion of the capacity of the boiler A and the lamp B. Employing alcohol or other suitable fluid to fill the lamp B, there is a very accurately-determined ratio between the quantity of alcohol and the quantity of water which is capable of evaporating by its combustion. I so proportion the capacity of the lamp B to the capacity of the boiler A that the alcohol or other fluid will always be consumed in the lamp just before the water is quite all gone from the boiler.

The driving-wheels are marked M. There are crank-pins on each, as indicated by m. Connections therefrom, marked N, lead to pistons in oscillating cylinders P P. These are provided with accurately-turned projections p, chambered to serve as stop-cocks, and fitting within correspondingly-provided sockets O, which communicate with the interior of the boiler A through the branched pipe a. The construction of these oscillating cylinders P, with their stop-cock bearings p, will involve no difficulty, as such has long been familiar to engineers. R R are hooks formed on the ends of the projections p, and approaching near to each other, as indicated in Fig. 3. T is a loop of metal adapted to fit upon these hooks and hold them together while allowing each to turn to a sufficient extent independently of the other. When it is desired to liberate the cylinders the link T is removed from the hooks R, and they may then be drawn out from their respective sockets. When it is desired to replace and retain them they are introduced in the proper position, and the link T slipped upon the hooks R. In order to increase the certainty of their retention the hooks R R may be bent a little after the link T is in place. The wheels M may be forcibly held by a stout rod thrust through them in the proper position when the engine is to be held stationary. When it is to be started, after steam is raised, the stick is removed and the wheels are allowed to turn. My locomotive will run continuously and rapidly for several minutes.

There may be front wheels in the form of an ordinary bearing-truck of a locomotive; but I propose for economy to employ a single leading wheel, as indicated by G. This is mounted on a swiveling support, g, which turns with considerable friction on a pivoted bearing H. The position of this arm g and the wheel G mounted thereon may be adjusted by inclining it to one side or the other, and the locomotive will then travel continuously in a nearly-perfect circle. This swiveling wheel G and its connections may be best adapted for cheap toys. For larger locomotives I propose to employ two or four wheels properly mounted.

It will be obvious that for use in under-water navigation long continued, flying-machines, or traversing with small attached cars through small tubes in communicating between distant parts of a city, or analogous uses involving a necessity for considerable power and long-extended work, both the boiler and the lamp may be considerably larger than here represented. But I esteem it very important that the proportion shall always be such that the lamp shall fail and go out or go nearly out immediately before the last of the water is consumed. I thus guard against explosions and the burning or injury of any part of the apparatus, while insuring a high degree of efficiency in the apparatus.

Claims.

1. The removable link or loose attachment T and hooks R R, arranged to serve as represented relatively to the oscillating cylinders P P and their connections, for the purposes specified.

2. The entire construction, combination, and arrangement of the boiler and attached chamber A A', lamp B b, plug D, wheels M, and cranks m, oscillating cylinders P P, and swiveling front guide G g, adapted to serve together, as herein specified.

In testimony whereof I hereunto set my name in presence of two subscribing witnesses.

HENRY NICOLL HAMILTON.

Witnesses:
   THOMAS D. STETSON,
   W. C. DEY.